US012307985B2

(12) United States Patent
Zhao

(10) Patent No.: US 12,307,985 B2
(45) Date of Patent: May 20, 2025

(54) LIQUID CRYSTAL DISPLAY DEVICES AND BACKLIGHT DRIVING METHODS THEREOF BASED ON PRESET EXPRESSION WITH RESPECT TO AVERAGE AND MAXIMUM BRIGHTNESS VALUES

(71) Applicant: TCL CHINA STAR OPTOELECTRONICS TECHNOLOGY CO., LTD., Guangdong (CN)

(72) Inventor: Yizhuo Zhao, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/509,362

(22) Filed: Nov. 15, 2023

(65) Prior Publication Data

US 2025/0061863 A1 Feb. 20, 2025

(30) Foreign Application Priority Data

Aug. 18, 2023 (CN) ........................ 202311055410.1

(51) Int. Cl.
*G09G 3/34* (2006.01)
*G09G 3/36* (2006.01)

(52) U.S. Cl.
CPC ............. *G09G 3/3406* (2013.01); *G09G 3/36* (2013.01); *G09G 2320/0626* (2013.01); *G09G 2360/16* (2013.01)

(58) Field of Classification Search
CPC ................... G09G 3/3406; G09G 3/36; G09G 2320/0626; G09G 2360/16; G09G 3/3426; G09G 3/3225; G09G 3/2007; G06T 5/40
See application file for complete search history.

(56) References Cited

U.S. PATENT DOCUMENTS

2009/0033602 A1* 2/2009 Alexander ........... G09G 3/3225 345/77
2009/0273558 A1* 11/2009 Lee ...................... G09G 3/3426 345/102

(Continued)

FOREIGN PATENT DOCUMENTS

CN 112967688 A 6/2021
EP 2113903 A2 11/2009

(Continued)

OTHER PUBLICATIONS

Korean Office Action issued in corresponding Korean Patent Application No. 10-2023-0148549 dated Jun. 26, 2024, pp. 1-6.

(Continued)

*Primary Examiner* — Richard J Hong
(74) *Attorney, Agent, or Firm* — PV IP PC; Wei Te Chung

(57) ABSTRACT

Liquid crystal display devices and backlight driving methods thereof are provided. A backlight module of the liquid crystal display device includes a light-emitting unit, a calculation unit, a comparison unit, and a control unit. The calculation unit calculates a first preset backlight brightness value of a backlight partition according to a partition average brightness value and a partition maximum brightness value of a corresponding display partition under a current frame display image. The comparison unit compares a second preset backlight brightness value of the backlight partition under a previous frame display image and the first preset backlight brightness value, and outputs a comparison result. The control unit outputs a first brightness driving value of the backlight partition under the current frame display image according to the comparison result. The light-emitting unit emits light in the backlight partition according to first brightness driving value.

14 Claims, 4 Drawing Sheets

(56) References Cited

U.S. PATENT DOCUMENTS

| | | | | |
|---|---|---|---|---|
| 2010/0225674 | A1* | 9/2010 | Choe | G09G 3/3406 345/102 |
| 2011/0115826 | A1* | 5/2011 | Fujiwara | G09G 3/3426 345/690 |
| 2022/0058781 | A1* | 2/2022 | Gal | G06T 5/40 |
| 2022/0309984 | A1* | 9/2022 | Xi | G09G 3/2007 |
| 2023/0215392 | A1* | 7/2023 | Cao | G09G 3/3426 345/204 |

FOREIGN PATENT DOCUMENTS

| | | | | | |
|---|---|---|---|---|---|
| EP | 2202718 | A1 | | 6/2010 | |
| JP | 2012118419 | A | | 6/2012 | |
| JP | 2014010204 | A | | 1/2014 | |
| JP | 2018156813 | A | | 10/2018 | |
| JP | 2019090997 | A | | 6/2019 | |
| JP | 2019168603 | A | | 10/2019 | |
| KR | 20100048391 | A | * | 5/2010 | G09G 3/34 |
| KR | 20220025552 | A | | 3/2022 | |

OTHER PUBLICATIONS

Japanese Office Action issued in corresponding Japanese Patent Application No. 特願2023-195842 dated Aug. 6, 2024, pp. 1-4.
European Office Action issued in corresponding European Patent Application No. 23209768.3 dated Mar. 19, 2024, pp. 1-13.

* cited by examiner

LIQUID CRYSTAL DISPLAY DEVICES AND BACKLIGHT DRIVING METHODS THEREOF BASED ON PRESET EXPRESSION WITH RESPECT TO AVERAGE AND MAXIMUM BRIGHTNESS VALUES

CROSS-REFERENCE TO RELATED APPLICATION

This application claims priority to Chinese Patent Application No. 202311055410.1, filed on Aug. 18, 2023, the disclosure of which is incorporated herein by reference in its entirety.

TECHNICAL FIELD

The present disclosure relates to the field of display technologies, and in particular, to liquid crystal display devices and backlight driving methods of a liquid crystal display device.

BACKGROUND

A liquid crystal display (LCD) device having a mini light-emitting diode (mini-LED) backlight dynamically adjusts a backlight brightness of its backlight module through the local dimming (LD) algorithm to achieve ultra-high contrast of its display image. The LD algorithm counts brightness information of the display images of all backlight partitions of the backlight module, and then selects an appropriate backlight brightness according to the brightness information. The higher the brightness of a certain area of the display image, the higher the brightness of the backlight partition corresponding to the certain area. When a certain area of the display image is black, the backlight partition corresponding to the certain area does not emit light. On a condition that the display image to be displayed is a dark image with small and scattered bright areas, such as a starry sky image, an average brightness of the display image and an average brightness of the backlight partition corresponding to the display image are both very low, thus the LD algorithm may obtain a backlight brightness value very close to zero. Once the backlight accuracy is not high enough, the backlight module may eventually perform backlight output in a state where the backlight brightness value is zero, resulting in a loss of display details and insufficient detail display capabilities of the LCD device.

SUMMARY

In view of above, liquid crystal display devices are provided according to embodiments of the present disclosure. The liquid crystal display device includes:

- a display panel, including a plurality of display partitions; and
- a backlight module, including:
- a light-emitting unit, including a plurality of backlight partitions corresponding to the display partitions;
- a first processor, defined as a calculation unit, configured to calculate a first preset backlight brightness value of each backlight partition of the backlight partitions according to a partition average brightness value and a partition maximum brightness value of a corresponding one of the display partitions under a current frame display image;
- a second processor, defined as a comparison unit, configured to compare a second preset backlight brightness value of the backlight partition under a previous frame display image and the first preset backlight brightness value, and configured to output a comparison result; and
- a third processor, defined as a control unit, configured to output a first brightness driving value of the backlight partition under the current frame display image according to the comparison result, and configured to control the light-emitting unit to emit light in the backlight partition according to first brightness driving value.

Backlight driving methods of a liquid crystal display device are also provided according to embodiments of the present disclosure. The liquid crystal display device includes a display panel and a backlight module, the display panel includes a plurality of display partitions, the backlight module includes a plurality of backlight partitions corresponding to the display partitions, and the backlight driving method include:

- calculating, by a first processor defined as a calculation unit, a first preset backlight brightness value of each backlight partition of the backlight partitions according to a partition average brightness value and a partition maximum brightness value of a corresponding one of the display partitions under a current frame display image;
- comparing, by a second processor defined as a comparison unit, a second preset backlight brightness value of the backlight partition under a previous frame display image and the first preset backlight brightness value, and outputting a comparison result;
- outputting, by a third processor defined as a control unit, a first brightness driving value of the backlight partition under the current frame display image according to the comparison result; and
- controlling, by the third processor, the backlight partition to emit light according to the first brightness driving value.

DETAILED DESCRIPTION

The present disclosure is further detailed below with reference to the accompanying drawings and examples. It will be appreciated that the specific embodiments described herein are merely illustrative of the invention and are not limited thereto.

Figure 1:
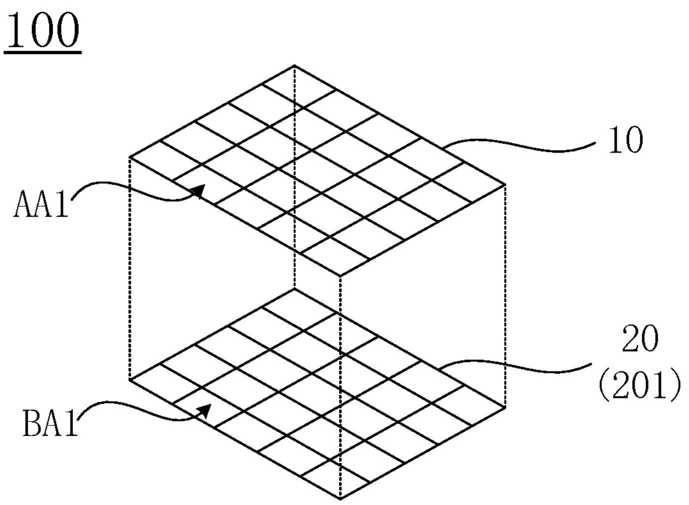
FIG. 1 is a block diagram of a liquid crystal display device provided according to some embodiments of the present disclosure.

As shown in FIG. 1, a liquid crystal display device 100 provided in the embodiments includes a display panel 10 and a backlight module 20. The display panel 10 includes a display area and a non-display area other than the display area. The display area includes a plurality of display partitions AA1. The display area AA is configured to provide display images. Each display partition AA1 is provided with a plurality of pixels.

Figure 2:
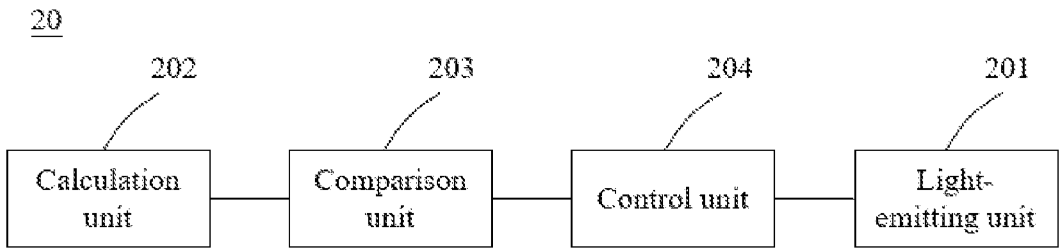
FIG. 2 is a first block diagram of a backlight module provided according to some embodiments of the present disclosure.

As shown in FIG. 2, the backlight module 20 specifically includes a light-emitting unit 201, a calculation unit 202, a comparison unit 203, and a control unit 204.

The light-emitting unit 201 includes a plurality of backlight partitions BA1 corresponding to the display partitions AA1, and each backlight partition BA1 is provided with a plurality of mini-LEDs. The light-emitting unit 201 is driven in a local dimming (LD) mode. The plurality of backlight partitions BA1 and the plurality of display partitions AA1 are in a one-to-one correspondence, that is, each display partition AA1 has a corresponding backlight partition BA1 that provides backlight sources for image display. The whole light-emitting unit 201 is divided into the plurality of backlight partitions BA1 that can be driven separately by the LD algorithm, and the LD algorithm automatically adjusts drive currents of the LEDs in the backlight partitions according to gray scales to be displayed in different areas of the display images corresponding to the backlight partitions, so that the brightness of each backlight partition BA1 in the light-emitting unit 201 is adjusted separately to improve the contrast of the display images.

The calculation unit 202 is configured to calculate a first preset backlight brightness value of the backlight partition BA1 corresponding to the display partition AA1 according to a partition average brightness value and a partition maximum brightness value of the display partition AA1 under a current frame display image. The first preset backlight brightness value of the backlight partition BA1 under the current frame display image is related to a display brightness value of the display partition AA1 corresponding to the backlight partition BA1 under the current frame display image. The preset backlight brightness value of the backlight partition BA1 depends on the display brightness value of the display partition AA1 corresponding to the backlight partition BA1 under the current frame display image.

The calculation unit 202 obtains brightness values of all pixels in the display partition AA1, determines a maximum brightness value of the pixels in the display partition AA1, and defines the maximum brightness value of the pixels in the display partition AA1 as the partition maximum brightness value of the display partition AA1.

The calculation unit 202 accumulates the brightness values of all pixels in the display partition AA1 to obtain a sum of the brightness values of the display partition AA1, and then obtains the partition average brightness value according to the sum of the brightness values of the display partition AA1 and the number of pixels in the display partition AA1.

The calculation unit 202 is further configured to calculate the first preset backlight brightness value of the backlight partition BA1 according to the partition average brightness value of the display partition AA1 corresponding to the backlight partition BA1 under the current frame display image, the partition maximum brightness value of the same display partition AA1, a first preset weight value, and a second preset weight value. The first preset weight value is a weight value corresponding to the partition maximum brightness value, and the second preset weight value is a weight value corresponding to the partition average brightness value. The first preset weight values corresponding to different backlight partitions BA1 under different frame display images are the same, and the second preset weight values corresponding to different backlight partitions BA1 under different frame display images are the same.

The first preset weight value is a preset weight value of the partition maximum brightness value stored in the calculation unit 202. The second preset weight value is a preset weight value of the partition average brightness value stored in the calculation unit 202.

When calculating the brightness value of backlight partition BA1 through the LD algorithm, the partition average brightness value and the partition maximum brightness value of the backlight partition BA1 under the corresponding display image will be referred to, so that a brightness value of the backlight partition BA1 may be adjusted by accordingly adjusting the weight values of the partition maximum brightness value and the partition average brightness value. Therefore, the preset backlight brightness value of the corresponding backlight partition BA1 can be calculated according to the first preset weight value, the partition maximum brightness value, the second preset weight value, and the partition average brightness value. In the LD algorithm, increasing the first preset weight value will increase the brightness of all backlight partitions BA1, and this adjustment may improve the details of an initial dark area of the display image, but the halo of an initial bright area of the display image may become serious. Therefore, the first preset weight value should not be too large and should be less than 1.

The comparison unit 203 is configured to compare a second preset backlight brightness value of the backlight partition BA1 under a previous frame display image and the first preset backlight brightness value of the backlight partition BA1 under the current frame display image, and is configured to output a comparison result. The comparison unit 203 compares the preset backlight brightness values of the same backlight partition BA1 under two preceding and subsequent frame display images, and outputs a comparison result of whether the preset backlight brightness values of the same backlight partition BA1 under the two preceding and subsequent frame display images are the same. The comparison unit 203 may also store the preset backlight brightness values of each backlight partition BA1 under different frame display images, so as to compare the preset backlight brightness values of a specific backlight partition BA1 under the two preceding and subsequent frame display images.

The control unit 204 is configured to output a first brightness driving value of the backlight partition BA1 under the current frame display image according to the comparison result, so that the light-emitting unit 201 emits light in the corresponding backlight partition according to the first brightness driving value, where the first brightness driving value is determined according to a second brightness driving value of the same backlight partition BA1 under the previous frame display image and the first preset backlight brightness value under the current frame display image.

When the first preset backlight brightness value and the second preset backlight brightness value of the same backlight partition BA1 are the same, the brightness values of the backlight partition BA1 under the two preceding and subsequent frame display images will not change, and there is no need to adjust the detail display capability of the backlight partition BA1 under the current frame display image, that is, there is no need to enhance the weight value of the partition maximum brightness value and the weight value of the partition average brightness value of this display partition BA1.

When this comparison result occurs, the control unit 204 obtains a first driving weight value of the backlight partition BA1 under the previous frame display image and a second driving weight value of the backlight partition BA1 under the previous frame display image, determines the first driving weight value of the backlight partition BA1 under the previous frame display image as a first driving weight value under the current frame display image, and determines the second driving weight value of the backlight partition BA1 under the previous frame display image as a second driving weight value under the current frame display image. That is, the first driving weight values of the backlight partition BA1 under the two preceding and subsequent frame display images are the same, and the second driving weight values of the backlight partition BA1 under the two preceding and subsequent frame display images are the same.

When the second preset backlight brightness value of the same backlight partition BA1 is different from the first preset backlight brightness value, the brightness values of the backlight partition BA1 under the two preceding and subsequent frame display images will change, and the detail display capability of the backlight partition BA1 under the current frame display image needs to be optimized, that is, it is necessary to adjust the weight values of the partition maximum brightness value and the partition average brightness value of the display partition BA1.

The control unit 204 outputs the first brightness driving value according to the partition maximum brightness value, the first driving weight value corresponding to the partition maximum brightness value, the partition average brightness value, and the second driving weight value corresponding to the partition average brightness value. The first driving weight value is determined according to the first preset weight value and a first driving weight value (or defined as a third driving weight value) corresponding to the partition maximum brightness value of the same backlight partition under the previous frame display image, and the second driving weight value is determined according to the second preset weight value and a second driving weight value (or defined as a fourth driving weight value) corresponding to the partition average brightness value of the same backlight partition under the previous frame display image. The control unit 204 may also store the driving weight value corresponding to the partition maximum brightness value of and the driving weight value corresponding to the partition average brightness value of each backlight partition BA1 under each frame display image, so as to facilitate the comparation between the driving weight values of a specific backlight partition BA1 under the two preceding and subsequent frame display images.

The control unit 204 is configured to calculate the first brightness driving value according to a first preset relational expression. The first preset relational expression is:

$$L(x) = k1 * \mathrm{L\_max}(x) + k2 * \mathrm{L\_av}(x); \tag{1}$$

In the above-mentioned first preset relational expression (1), L(x) is the first brightness driving value, L_max(x) is the partition maximum brightness value, L_av(x) is the partition average brightness value, k1 is the first driving weight value under the current frame display image, and k2 is the second driving weight value under the current frame display image. A numerical range of k1 is $0<k1<1$, and a numerical range of k2 is $0<k2<1$.

When the partition maximum brightness value and the partition average brightness value are determined, adjusting the first driving weight value and/or the second driving weight value can adjust the brightness driving value, and then adjust the backlight brightness of the corresponding backlight partition BA1, so as to improve the backlight accuracy of the corresponding backlight partition BA1, ensure that the details of the display image of the corresponding backlight partition BA1 are displayed normally, thereby improving the detail display capability of the liquid crystal display device.

The control unit 204 is also configured to calculate one of the first driving weight value and the second driving weight value according to the other one of the first driving weight value and the second driving weight value and a second preset relational expression. The second preset relational expression is:

$$k1 + k2 = 1; \tag{2}$$

In the above second preset relational expression (2), k1 is the first driving weight value, and k2 is the second driving weight value.

The control unit 204 outputs a corresponding brightness driving value according to the comparison result that the preset backlight brightness values of the same backlight partition BA1 under the two preceding and subsequent frame display images are the same, and then the light-emitting unit 201 emits light in the backlight partition according to the brightness driving value. The control unit 204 also outputs a corresponding brightness driving value according to the comparison result that the preset backlight brightness values of the same backlight partition BA1 under the two preceding and subsequent frame display images are different, and then the light-emitting unit 201 emits light in the backlight partition according to the brightness driving value.

The calculation unit 202, the comparison unit 203, and the control unit 204 are processors. In some embodiments, the calculation unit 202, the comparison unit 203, and the control unit 204 are processors that have their own functions and are independent of each other. In some embodiments, the calculation unit 202, the comparison unit 203, and the control unit 204 are sub-processors that have their own functions and belong to the same processor. The aforementioned processor may be composed of integrated circuits, for example, may be composed of a single package of integrated circuits, or may be composed of multiple integrated circuits packaged with the same or different functions, depending on specific requirements.

Figure 3:
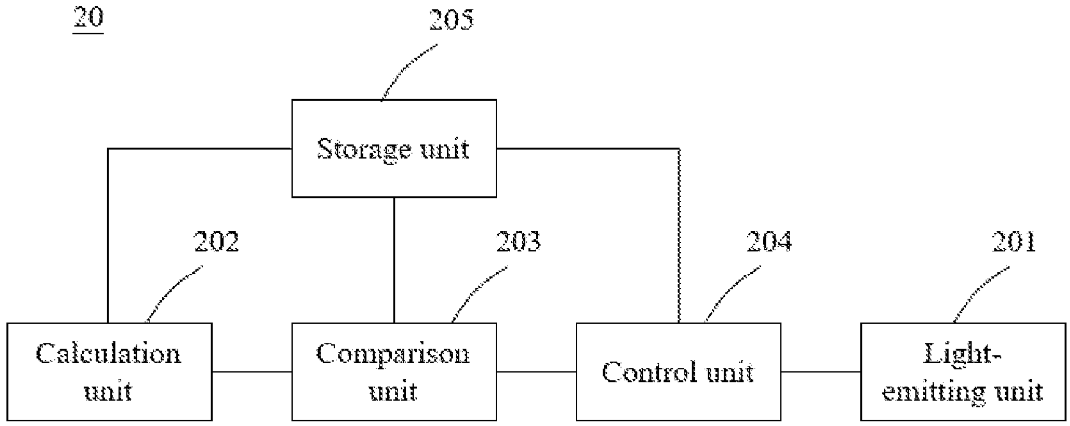
FIG. 3 is a second block diagram of a backlight module provided according to some embodiments of the present disclosure.

As shown in FIG. 3, in the liquid crystal display device 100 provided in the embodiments, the backlight module 20 may further include a storage unit 205. The storage unit 205 is configured to store the preset backlight brightness values of each backlight partition BA1 under different frame display images in real time, so as to provide the preset backlight brightness value of a certain backlight partition BA1 under a certain frame display image to the comparison unit 203 in real time. The storage unit 205 may also be configured to store the driving weight values corresponding to the partition maximum brightness values and the driving weight values corresponding to the partition average brightness values of each backlight partition BA1 under different frame display images in real time, so as to provide the driving weight values of a certain backlight partition BA1 under a certain frame display image to the control unit 204 in real time. In some embodiments, the storage unit 205 is a memory, which is non-volatile and readable storage medium that can be used to store data.

In the liquid crystal display device 100, the comparison unit 203 is configured to compare the preset backlight brightness value of the backlight partition BA1 under the previous frame display image and the preset backlight brightness value of the backlight partition BA1 under the current frame display image, the control unit 204 outputs the brightness driving value corresponding to the comparison result, and the light-emitting unit 201 emits light in the corresponding backlight partition according to the brightness driving value, which improves the backlight brightness of the backlight partition BA1 under a dark display image, and thus improving the detail display capability of the liquid crystal display device.

In the liquid crystal display device provided in the present disclosure, when the comparison result occurs that the preset backlight brightness values of the same backlight partition BA1 under the two preceding and subsequent frame display images are different, i.e., the first preset backlight brightness value and the second preset backlight brightness values are different, the calculation unit 202 is also configured to calculate the average grayscale value of the display panel 10 under the current frame display image and the maximum backlight grayscale value of all backlight partitions BA1 under the current frame display image.

The calculation unit 202 obtains the grayscale values of all pixels in all display partitions AA1 under the current frame display image, accumulates the brightness values of all pixels to obtain a total grayscale value of the display panel 10, and then calculates according to the total grayscale value of the display panel 10 and a total number of pixels of the display panel 10 to obtain an average grayscale value of the display panel under the current frame display image.

The calculation unit 202 obtains the grayscale values of all mini-LEDs in all backlight partitions BA1 under the current frame display image, and determines a maximum grayscale value of the mini-LEDs in all backlight partitions BA1.

The control unit 204 is also configured to judge whether the average grayscale value of the display panel 10 under the current frame display image is less than a first preset threshold value and whether the maximum backlight grayscale value of all backlight partitions BA1 under the current frame display image is less than a second preset threshold value.

When the average grayscale value of the display panel 10 under the current frame display image is greater than or equal to the first preset threshold value, an average brightness under the current frame display image is high, and all mini-LEDs of the light-emitting unit 201 are turned on or only a few of the mini-LEDs are closed under the current frame display image.

On this condition, there is no need to adjust the brightness value of the backlight partition BA1, and there is no need to optimize the detail display capability of the backlight partition BA1 under the current frame display image, that is, there is no need to adjust the weight value corresponding to the partition maximum brightness value and the weight value corresponding to the partition average brightness value of the backlight partition BA1. Under this judgment result, the control unit 204 determines the first preset weight value as the first driving weight value and determines the second preset weight value as the second driving weight value, then the first preset backlight brightness value of the backlight partition BA1 is the same as the first brightness driving value of the backlight partition BA1, and the light-emitting unit 201 emits light in the corresponding backlight partition BA1 according to the first preset backlight brightness value under the current frame display image.

When the average grayscale value of the display panel 10 under the current frame display image is less than the first preset threshold value, and the maximum backlight grayscale value of all backlight partitions BA1 under the current frame display image is greater than or equal to the second preset threshold value, the average brightness under the current frame display image is low and a peak brightness under the current frame display image is high. In this case, there is a backlight partition BA1 with a higher backlight brightness, and the backlight partition BA1 produces a light diffusion phenomenon according to the high backlight brightness, and the light diffusion phenomenon will improve the detail display capability of the dark areas around the backlight partition BA1 having the higher backlight brightness.

On this condition, there is no need to adjust the brightness value of the backlight partition BA1 having the higher backlight brightness, and there is no need to optimize the detail display capability of the backlight partition BA1 under the current frame display image, that is, there is no need to adjust the weight value corresponding to the partition maximum brightness value and the weight value corresponding to the partition average brightness value of the backlight partition BA1. the control unit 204 determines the first preset weight value as the first driving weight value and determines the second preset weight value as the second driving weight value, then the first preset backlight brightness value of the backlight partition BA1 is the same as the first brightness driving value of the backlight partition BA1, and the light-emitting unit 201 emits light in the corresponding backlight partition BA1 according to the first preset backlight brightness value under the current frame display image.

When the average grayscale value of the display panel 10 under the current frame display image is less than the first preset threshold value, and the maximum backlight grayscale value of all backlight partitions BA1 under the current frame display image is less than the second preset threshold value, an overall brightness of all backlight partitions BA1 is low or the mini-LEDs of all backlight partitions BA1 are all turned off. In order to ensure that the display partition AA1 corresponding to the backlight partition BA1 can display details, in this case, the detail display capability of the backlight partition BA1 needs to be improved.

Under this judgment result, the control unit 204 is further configured to re-determine the first driving weight value of the backlight partition BA1 under the current frame display image according to the first preset weight value and an adjusted weight value, and re-determine the second driving weight value of the same backlight partition under the current frame display image according to the second preset weight value and the adjusted weight value.

A specific value of the adjusted weight value is determined through experimental debugging, and the control unit 204 determines the first driving weight value according to the first preset weight value, the adjusted weight value determined by debugging, and a third preset relational expression. The third preset relational expression is:

$$ky1 + k0 = k1; \quad (3)$$

In the above third preset relational expression (3), ky1 is the first preset weight value, k0 is the adjusted weight value, and k1 is the first driving weight value. Among them, a specific numerical range of the adjusted weight value k0 is $0<k0<1-ky1$. In order to improve the detail display capability of the backlight partition BA1 under the dark display image, the weight value corresponding to the partition maximum brightness value of the backlight partition needs to be increased, so the adjusted weight value should be greater than 0. At the same time, in order to avoid the halo expansion of the display image caused by excessive dimming of the backlight partition BA1, the first driving weight value k1 calculated from the first preset weight value ky1 and the adjusted weight value k0 should be less than 1, that is, the adjusted weight value should also be less than a difference between 1 and the first preset weight value ky1 while it is greater than 0.

Since the redetermined first driving weight value and the corresponding second driving weight value still need to satisfy the above-mentioned second preset relational expression (2), so that corresponding second driving weight value can be calculated according to the redetermined first driving weighting value and the second preset relational expression (2). Then the brightness driving value of the backlight partition under the current frame display image can be calculated according to the first preset relational expression (1), the redetermined first driving weight value, the corresponding second driving weight value, the partition average brightness value of the corresponding backlight partition, and the partition maximum brightness value of the corresponding backlight partition.

In the liquid crystal display device 100, since the control unit 204 is configured to determine a value relationship between the average grayscale value under the current frame display image and the first preset threshold value, and determine a value relationship between the maximum backlight grayscale value of all backlight partitions under the current frame display image and the second preset threshold value, so that it can also avoid the halo expansion of the display image caused by excessive dimming of the backlight partition BA1 while increasing the display brightness of the backlight partition BA1 under the dark display image to improve the detail display capability of the liquid crystal display device.

Figure 4:
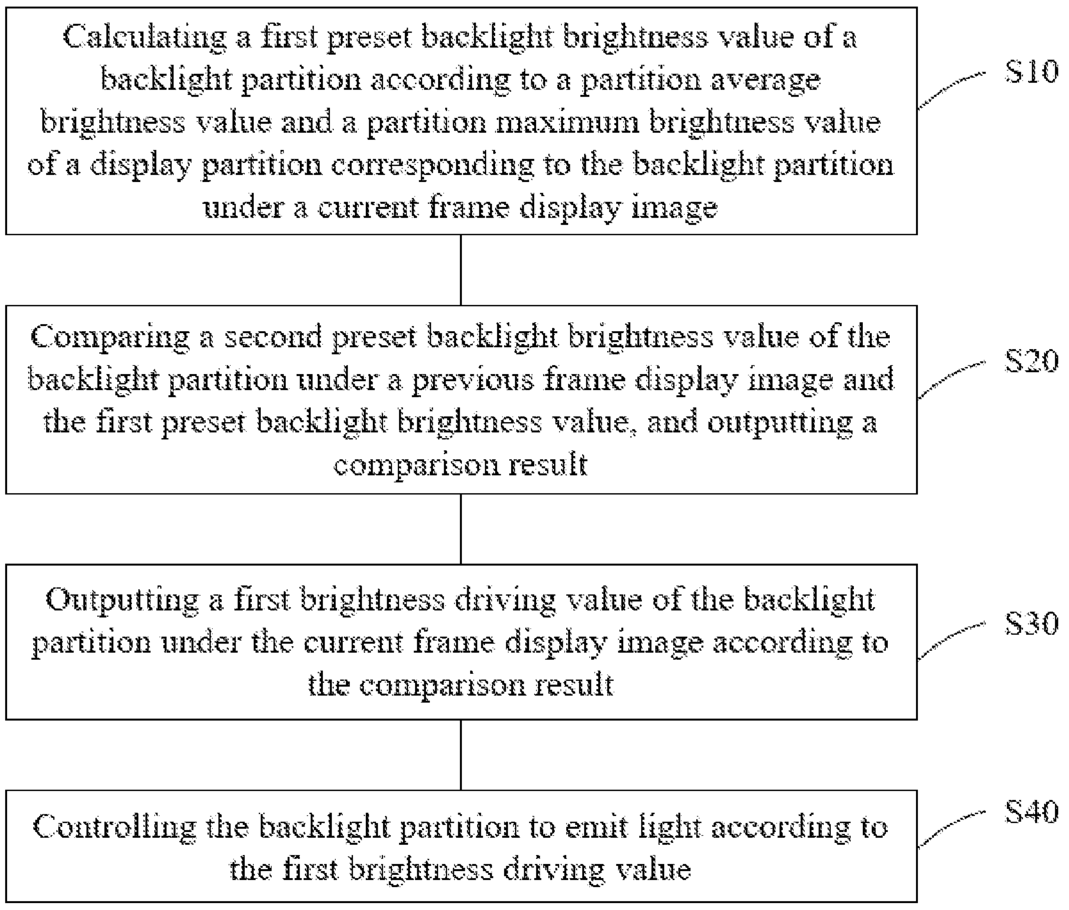
FIG. 4 a first flow chart of a backlight driving method of a liquid crystal display device provided according to some embodiments of the present disclosure.

As shown in FIG. 4, embodiments of the present disclosure also provide backlight driving methods of a liquid crystal display device. The liquid crystal display device in the embodiments includes a display panel and a backlight module. The display panel includes a plurality of display partitions. The backlight module includes a plurality of backlight partitions corresponding to the display partitions. The backlight driving method in the embodiments includes the following steps of S10, S20, S30, and S40.

Figure 5:
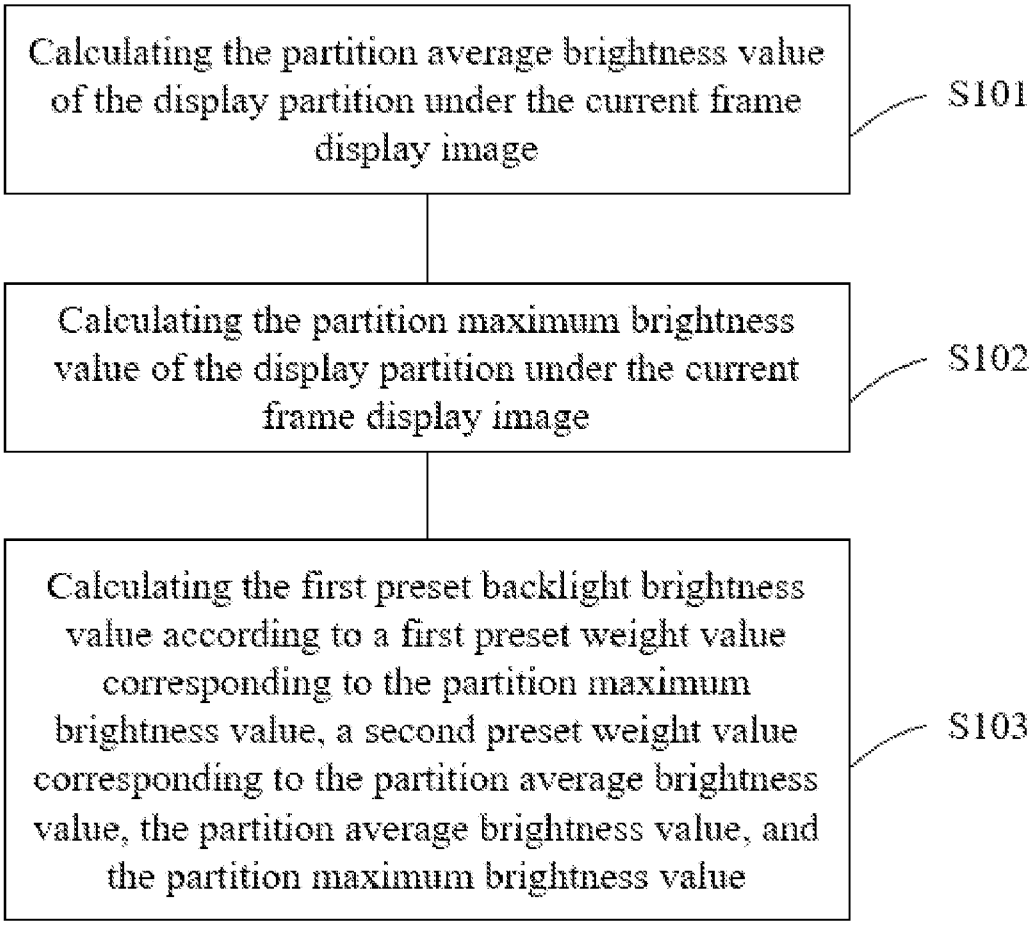
FIG. 5 is a specific flow chart of S10 in FIG. 4.

The step S10 includes: calculating a first preset backlight brightness value of the backlight partition corresponding to the display partition according to a partition average brightness value and a partition maximum brightness value of the display partition under a current frame display image. As shown in FIG. 5, the step S10 may specifically include steps of S101, S102, and S103.

The step S101 includes: calculating the partition average brightness value of the display partition under the current frame display image. Brightness values of all pixels in the display partition AA1 are accumulated to obtain a sum of the brightness values of the display partition AA1, and then the sum of the brightness values of the display partition AA1 is divided by the number of the pixels in the display partition to obtain the partition average brightness value of the display partition.

The step S102 includes: calculating the partition maximum brightness value of the display partition under the current frame display image. The brightness values of all pixels in the display partition AA1 are obtained, and a maximum brightness value of the pixels in the display partition AA1 is determined, and the maximum brightness value of the pixels in the display partition AA1 is defined as the partition maximum brightness value.

The step S103 includes: calculating the first preset backlight brightness value according to a first preset weight value corresponding to the partition maximum brightness value, a second preset weight value corresponding to the partition average brightness value, the partition average brightness value, and the partition maximum brightness value.

The step S20 includes: comparing a second preset backlight brightness value of the backlight partition under a previous frame display image and the first preset backlight brightness value, and outputting a comparison result. That is to compare whether the preset backlight brightness values of the same backlight partition under two preceding and subsequent frame display images are the same.

The comparison result in the step S20 is either the second preset backlight brightness value is the same as the first preset backlight brightness value, or the second preset backlight brightness value is different from the first preset backlight brightness value.

The step S30 includes: outputting a first brightness driving value of the backlight partition under the current frame display image according to the comparison result.

In the backlight driving method of the crystal display device provided in the embodiments, the preset backlight brightness value of the backlight partition under the previous frame display image is compared with the preset backlight brightness value of the backlight partition under the current frame display image, and then the first brightness driving value of the backlight partition under the current frame display image is determined according to the comparison result, which increases the display brightness of the backlight partition under the dark display image, thereby improving the detail display capability of the liquid crystal display device.

Figure 6:
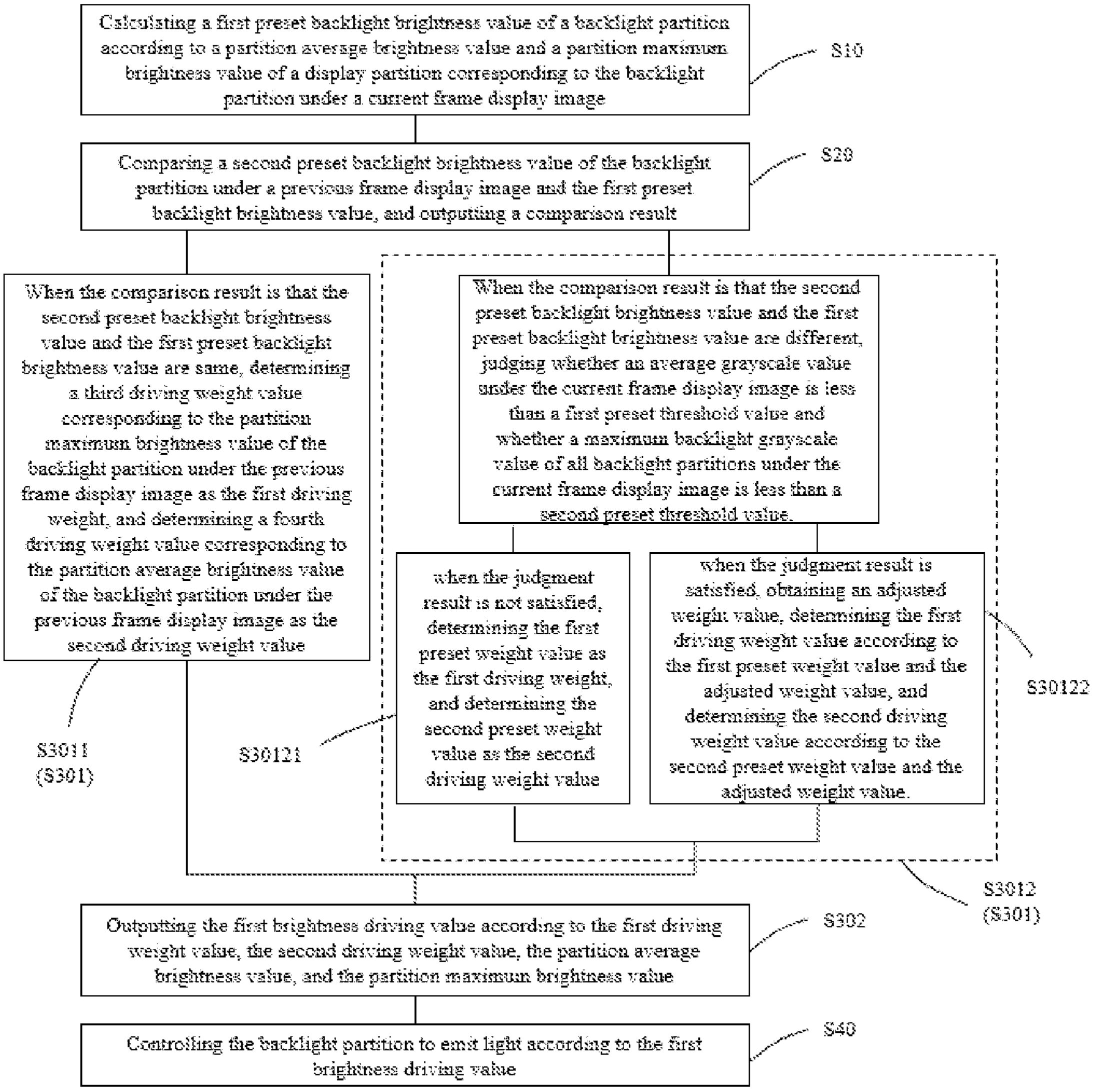
FIG. 6 a second flow chart of a backlight driving method of a liquid crystal display device provided according to some embodiments of the present disclosure.

As shown in FIG. 4 and FIG. 6, the step S30 may specifically include steps of S301 and S302.

The step S301 includes: determining a first driving weight value corresponding to the partition maximum brightness value and a second driving weight value corresponding to the partition average brightness value according to the comparison result.

The step S301 may further specifically include following steps of S3011 and S3012.

The step S3011 includes: when the comparison result is that the second preset backlight brightness value is the same as the first preset backlight brightness value, determining a first driving weight value (or defined as a third driving weight value) corresponding to the partition maximum brightness value of the backlight partition under the previous frame display image as the first driving weight value of the same backlight partition under the current frame display image, and determining a second driving weight value (or defined as a fourth driving weight value) corresponding to the partition average brightness value of the backlight partition under the previous frame display image as the second driving weight value of the same backlight partition under the current frame display image.

The step S3012 includes: when the comparison result is that the second preset backlight brightness value is different from the first preset backlight brightness value, judging whether an average grayscale value under the current frame display image is less than a first preset threshold value and whether a maximum backlight grayscale value of all backlight partitions under the current frame display image is less than a second preset threshold value, and determining the first driving weight value and the second driving weight value under the current frame display image according to a judgment result.

The step S3012 may further include steps of S30121 and S30122.

The step S30121 includes: when the judgment result is not satisfied, determining the first preset weight value as the first driving weight value under the current frame display image, and determining the second preset weight value as the second driving weight value under the current frame display image.

The step S30122 includes: when the judgment result is satisfied, that is, when the average grayscale value under the current frame display image is less than the first preset threshold value and the maximum backlight grayscale value of all backlight partitions under the current frame display image is less than the second preset threshold value, obtaining an adjusted weight value, determining the first driving weight value under the current frame display image according to the first preset weight value and the adjusted weight value, and determining the second driving weight value under the current frame display image according to the second preset weight value and the adjusted weight value.

In the step S30122, the first driving weight value may be determined according to the first preset weight value, the adjusted weight value, and a third preset relational expression. The third preset relational expression is:

$$ky1+k0=k1; \tag{3}$$

In the above third preset relational expression (3), ky1 is the first preset weight value, k0 is the adjusted weight value, and k1 is the first driving weight value. Among them, a specific numerical range of the adjusted weight value k0 is $0<k0<1-ky1$.

The step S302 includes: outputting the first brightness driving value according to the first driving weight value, the second driving weight value, the partition average brightness value, and the partition maximum brightness value.

In step S302, the first brightness driving value may be output according to a first preset relational expression, the first driving weight value, the second driving weight value, the partition average brightness value, and the partition maximum brightness value. The first preset relational expression is:

$$L(x)=k1*\mathrm{L\_max}(x)+k2*\mathrm{L\_av}(x); \tag{1}$$

In the above-mentioned first preset relational expression (1), L(x) is the first brightness driving value, L_max(x) is the partition maximum brightness value, L_av(x) is the partition average brightness value, k1 is the first driving weight value, and k2 is the second driving weight value. A numerical range of k1 is $0<k1<1$, and a numerical range of k2 is $0<k2<1$.

In the step S302, one of the first driving weight value and the second driving weight value may be calculated according to the other one of the first driving weight value and the second driving weight value and a second preset relational expression. The second preset relational expression is:

$$k1+k2=1; \tag{2}$$

In the above second preset relational expression (2), k1 is the first driving weight value, and k2 is the second driving weight value.

The step S40 includes: controlling the backlight partition to emit light according to the first brightness driving value.

In the backlight driving method of the liquid crystal display device, a value relationship between the average grayscale value under the current frame display image and the first preset threshold value is determined, a value relationship between the maximum backlight grayscale value of all backlight partitions under the current frame display image and the second preset threshold value is determined, and then the first brightness driving value of the backlight partition under the current frame display image is determined according to the judgment result, so that it can also avoid the halo expansion of the display image caused by excessive dimming of the backlight partition while increasing the display brightness of the backlight partition under the dark display image to improve the detail display capability of the liquid crystal display device.

Obviously, the above embodiments of the present disclosure are only intended to clearly illustrate the examples of the present invention, and are not a limitation of embodiments of the present disclosure. Those skilled in the art can make various changes, modifications, and substitutions without departing from the scope of the present disclosure. There is no need and cannot exhaust all implementations. Any modifications, equivalent substitutions, and improvements made within the spirit and principles of the present disclosure shall be covered by the scope of the claims in the present disclosure.

What is claimed is:

1. A liquid crystal display device, comprising:

a display panel comprising a plurality of display partitions, wherein each of the display partitions has a partition maximum brightness value and a partition average brightness value under each frame display image; and a backlight module comprising:

a light-emitting unit comprising a plurality of backlight partitions corresponding to the display partitions, wherein each of the backlight partitions has a preset backlight brightness value under each frame display image, the preset backlight brightness value under a current frame display image is defined as a first preset backlight brightness value, and the preset backlight brightness value under a previous frame display image is defined as a second preset backlight brightness value;

a first processor, defined as a calculation unit, configured to calculate the first preset backlight brightness value of each backlight partition of the backlight partitions according to the partition average brightness value, the partition maximum brightness value, a first preset weight value corresponding to the partition maximum brightness value, and a second preset weight value corresponding to the partition average brightness value;

a second processor, defined as a comparison unit, configured to compare the second preset backlight brightness value of each backlight partition and the first preset backlight brightness value, and configured to output a comparison result; and a third processor, defined as a control unit, configured to output a first brightness driving value of the backlight partition under the current frame display image according to the comparison result, and configured to control the light-emitting unit to emit light in the backlight partition according to the first brightness driving value;

wherein the control unit is further configured to output the first brightness driving value according to the partition maximum brightness value, a first driving weight value corresponding to the partition maximum brightness value, the partition average brightness value, and a second driving weight value corresponding to the partition average brightness value;

the first driving weight value is determined according to the first preset weight value and a third driving weight value corresponding to the partition maximum brightness value of the backlight partition under the previous frame display image, and the second driving weight value is determined according to the second preset weight value and a fourth driving weight value corresponding to the partition average brightness value of the backlight partition under the previous frame display image; and when the comparison result is that the first preset backlight brightness value and the second preset backlight brightness value are different, the control unit is further configured to judge whether an average grayscale value under the current frame display image is less than a first preset threshold value and whether a maximum backlight grayscale value of all of the backlight partitions under the current frame display image is less than a second preset threshold value, and the control unit is configured to determine the first preset weight value as the first driving weight value and determine the second preset weight value as the second driving weight value when a judgment result is not satisfied.

2. The liquid crystal display device according to claim 1, wherein the control unit is configured to calculate the first brightness driving value according to a first preset relational expression, and the first preset relational expression is: L(x)=k1*L_max(x)+k2*L_av(x), where L(x) is the first brightness driving value, L_max(x) is the partition maximum brightness value, L_av(x) is the partition average brightness value, k1 is the first driving weight value, and k2 is the second driving weight value.

3. The liquid crystal display device according to claim 2, wherein the control unit is further configured to calculate one of the first driving weight value and the second driving weight value according to the other one of the first driving weight value and the second driving weight value and a second preset relational expression, and the second preset relational expression is:

$$k1 + k2 = 1.$$

4. The liquid crystal display device according to claim 1, wherein the control unit is configured to determine the third driving weight value as the first driving weight value of the backlight partition under the current frame display image and determine the fourth driving weight value as the second driving weight value of the backlight partition under the current frame display image when the comparison result is that the first preset backlight brightness value and the second preset backlight brightness value are same.

5. The liquid crystal display device according to claim 1, wherein the calculation unit is configured to calculate the average grayscale value under the current frame display image and the maximum backlight grayscale value of all of the backlight partitions under the current frame display image when the comparison result is that the first preset backlight brightness value and the second preset backlight brightness value are different.

6. The liquid crystal display device according to claim 1, wherein when the judgment result is satisfied, the control unit is further configured to determine the first driving weight value of the backlight partition under the current frame display image according to the first preset weight value and an adjusted weight value, and determine the second driving weight value of the backlight partition under the current frame display image according to the second preset weight value and the adjusted weight value.

7. The liquid crystal display device according to claim 6, wherein the control unit is configured to determine the first driving weight value of the backlight partition under the current frame display image according to the first preset weight value, the adjusted weight value, and a third preset relational expression, and the third preset relational expression is: ky1+k0=k1, where ky1 is the first preset weight value, k0 is the adjusted weight value, and k1 is the first driving weight value of the backlight partition under the current frame display image.

8. The liquid crystal display device according to claim 1, wherein the backlight module further comprises a memory defined as a storage unit, and the storage unit is configured to store preset backlight brightness values of the backlight partition under different frame display images in real time.

9. A backlight driving method of a liquid crystal display device, the liquid crystal display device comprising a display panel and a backlight module, the display panel comprising a plurality of display partitions, each of the display partitions having a partition maximum brightness value and a partition average brightness value under each frame display image, the backlight module comprising a plurality of backlight partitions corresponding to the display partitions, each of the backlight partitions having a preset backlight brightness value under each frame display image, the preset backlight brightness value under a current frame display image being defined as a first preset backlight brightness value, the preset backlight brightness value under a previous frame display image being defined as a second preset backlight brightness value, and the backlight driving method comprising following steps:

calculating, by a first processor defined as a calculation unit, the first preset backlight brightness value of each backlight partition of the backlight partitions according to the partition average brightness value, the partition maximum brightness value, a first preset weight value corresponding to the partition maximum brightness value, and a second preset weight value corresponding to the partition average brightness value;

comparing, by a second processor defined as a comparison unit, the second preset backlight brightness value of each backlight partition and the first preset backlight brightness value, and outputting a comparison result;

determining, by a third processor defined as a control unit, a first driving weight value corresponding to the partition maximum brightness value and a second driving weight value corresponding to the partition average brightness value according to the comparison result;

calculating and outputting, by a third processor defined as a control unit, a first brightness driving value of the backlight partition under the current frame display image according to the partition maximum brightness value, the first driving weight value, the partition average brightness value, and the second driving weight value; and controlling, by the third processor, the backlight partition to emit light according to the first brightness driving value;

wherein one step of determining the first driving weight value corresponding to the partition maximum brightness value and the second driving weight value corresponding to the partition average brightness value according to the comparison result comprises:

determining, by the third processor, the first driving weight value according to the first preset weight value and a third driving weight value corresponding to the partition maximum brightness value of the backlight partition under the previous frame display image, and determining the second driving weight value according to the second preset weight value and a fourth driving weight value corresponding to the partition average brightness value of the backlight partition under the previous frame display image;

when the comparison result is that the first preset backlight brightness value and the second preset backlight brightness value are different, judging whether an average grayscale value under the current frame display image is less than a first preset threshold value and whether a maximum backlight grayscale value of all of the backlight partitions under the current frame display image is less than a second preset threshold value; and determining the first preset weight value as the first driving weight value and determining the second preset weight value as the second driving weight value when a judgment result is not satisfied.

10. The backlight driving method according to claim 9, wherein one step of calculating and outputting the first brightness driving value of the backlight partition under the current frame display image according to the partition maximum brightness value, the first driving weight value, the partition average brightness value, and the second driving weight value comprises:

calculating, by the third processor, the first brightness driving value according to a first preset relational expression, wherein the first preset relational expression is:

$$L(x) = k1 * \text{L\_max}(x) + k2 * \text{L\_av}(x),$$

where L(x) is the first brightness driving value, L_max(x) is the partition maximum brightness value, L_av(x) is the partition average brightness value, k1 is the first driving weight value, and k2 is the second driving weight value.

11. The backlight driving method according to claim 10, wherein the step of calculating and outputting the first brightness driving value of the backlight partition under the current frame display image according to the partition maximum brightness value, the first driving weight value, the partition average brightness value, and the second driving weight value further comprises:

calculating, by the third processor, one of the first driving weight value and the second driving weight value according to the other one of the first driving weight value and the second driving weight value and a second preset relational expression, wherein the second preset relational expression is:

$$k1 + k2 = 1.$$

12. The backlight driving method according to claim 9, wherein the step of determining the first driving weight value corresponding to the partition maximum brightness value and the second driving weight value corresponding to the partition average brightness value according to the comparison result comprises:

when the comparison result is that the second preset backlight brightness value and the first preset backlight brightness value are same, determining, by the third processor, the third driving weight value corresponding to the partition maximum brightness value of the backlight partition under the previous frame display image as the first driving weight value; and determining, by the third processor, the fourth driving weight value corresponding to the partition average brightness value of the backlight partition under the previous frame display image as the second driving weight value.

13. The backlight driving method according to claim 9, wherein the step of determining the first driving weight value corresponding to the partition maximum brightness value and the second driving weight value corresponding to the partition average brightness value according to the comparison result further comprises:

when the judgment result is satisfied, obtaining, by the third processor, an adjusted weight value; determining, by the third processor, the first driving weight value according to the first preset weight value and the adjusted weight value; and determining, by the third processor, the second driving weight value according to the second preset weight value and the adjusted weight value.

14. The backlight driving method according to claim 13, wherein one step of determining the first driving weight value according to the first preset weight value and the adjusted weight value comprises:

determining, by the third processor, the first driving weight value according to the first preset weight value, the adjusted weight value, and a third preset relational expression, wherein the third preset relational expression is:

$$ky1 + k0 = k1,$$

where ky1 is the first preset weight value, k0 is the adjusted weight value, and k1 is the first driving weight value.

* * * * *